United States Patent [19]

Young

[11] Patent Number: 5,500,462
[45] Date of Patent: Mar. 19, 1996

[54] STABLE WATERBORNE EPOXY RESIN DISPERSION CONTAINING MICRONIZED DICY

[75] Inventor: Glenda C. Young, Houston, Tex.

[73] Assignee: Shell Oil Company, Houston, Tex.

[21] Appl. No.: 474,350

[22] Filed: Jun. 7, 1995

Related U.S. Application Data

[62] Division of Ser. No. 424,846, Apr. 19, 1995.
[51] Int. Cl.$^6$ .................................................. C08L 63/02
[52] U.S. Cl. .......................................... 523/404; 427/386
[58] Field of Search .............................. 427/386; 523/404

[56] References Cited

U.S. PATENT DOCUMENTS

| | | | |
|---|---|---|---|
| 4,122,067 | 10/1978 | Anderson | 528/89 |
| 4,222,918 | 12/1980 | Zentner et al. | 428/378 |
| 4,385,138 | 5/1983 | Sagane et al. | 523/402 |
| 4,421,877 | 12/1983 | Alvino | 523/414 |
| 4,588,617 | 5/1986 | Oka | 523/414 |
| 5,236,974 | 8/1993 | Dreischhoff et al. | 523/403 |

*Primary Examiner*—Frederick Krass
*Attorney, Agent, or Firm*—Todd F. Volyn

[57] ABSTRACT

A process for producing stable dispersions of epoxy resins is presented in which an epoxy resin is mixed with water in the presence of a reactive surfactant to form a predispersed resin. To this predispersed resin, a micronized dicyandiamide based curing agent is added to form a predispersed resinous mass. The mass is stirred for a time and at a temperature sufficient to convert the predispersed resinous mass to a stable epoxy resin dispersion where the water is the continuous phase and the resin is the dispersed phase. The dispersion is useful as a one-pack epoxy resin system in applications such as binders for non-wovens, papers, textiles, composites, and laminates and in many coating applications.

4 Claims, No Drawings

STABLE WATERBORNE EPOXY RESIN DISPERSION CONTAINING MICRONIZED DICY

This is a division, of application Ser. No. 08/424,846, filed Apr. 19, 1995.

FIELD OF THE INVENTION

This invention relates to waterborne epoxy resin compositions and their preparation.

BACKGROUND OF THE INVENTION

Epoxy resin preparations comprised of aliphatic, cycloaliphatic, or aromatic macromolecules having reactive oxirane groups are well known in the art. They are known to form highly crosslinked thermosets when treated with curing agents. Innumerable combinations of epoxy resins and curing agents have been prepared and found useful in a wide range of applications such as laminates, adhesives, coatings, and structural components. Most have required the use of organic solvents so that desirable curing agent/resin combinations could be placed into solution.

Epoxy resin/curing agent combinations can be formulated into one-pack or two-pack compositions. In two-pack formulations, the components are separated and will cure, generally at room temperature, when combined. Metering the proper amounts of the components with the proper amount of mixing and other process conditions is important. Attaining the proper formulations with precision and accuracy can be difficult in certain circumstances. These systems can also have relatively short pot lives. One-pack systems can be used to overcome such difficulties. These systems employ a latent curing agent that is premixed with the epoxy resin. Curing occurs upon heating the mixture. Accelerators may also be used to reduce the severity of curing conditions or hasten the curing process.

Environmental and safety concerns have provided an impetus for the continued development of epoxy compositions that do not require the use of volatile solvents. Increasingly, manufacturers are attempting to produce completely aqueous systems. Unfortunately, many require a multitude of components which are necessary to obtain the desired properties of the applied or cured epoxy formulation. One-pack aqueous systems thus pose a significant challenge to the formulator.

Dicyandiamide (hereafter "DICY") is a particularly desirable latent epoxy curing agent. Its latency and ability to facilitate the formation of relatively impervious, dense cross linked polymers would be beneficial in one-pack systems. DICY has the following structure:

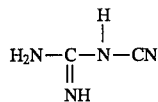

Indeed, the use of DICY as a hardener for epoxy systems is widespread in many industrial processes including epoxy resin prepregs, structural adhesives, saturants for paper and polyester cloth, as a sizing for glass fibers, and in industrial coatings. Chemically stable varnishes and partially reacted coated (B-staged) articles which can be handled and maintained ready for subsequent cure can also be fabricated from epoxy resin-DICY combinations. Articles that are prepared in this way typically have high thermal tolerances when compared to other epoxy systems. Thus, DICY cured epoxy resin systems bring extended pot life, high crosslink density, excellent chemical resistance, low color, "B-stagability," and high temperature to the cured article. In most epoxy resin systems, the DICY itself comprises only between about 2 and 10 parts per hundred. Thus, a solvent or mixture of solvents are necessary to produce a homologous epoxy-curing agent system. This poses a problem if one wishes to use DICY as the curing agent since it is not readily soluble in either epoxy resins or most solvents. For example, at room temperature, only 0.05% wt DICY is soluble in the liquid diglycidyl ether of Bisphenol A sold commercially as EPON® Resin 828 (a product of Shell Chemical Company). At 150° C. the solubility is only increased to about 0.6 g per 100 gms of resin. Formulators are often left only with the option to employ exotic and sometimes toxic solvents such as dimethyl formamide, propylene glycol monomethyl ether, and n-methyl pyrrolidinone.

DICY is somewhat more soluble in water (4.13 g/100 g $H_2O$ at 25° C.) than it is in most common solvents. Thus, some have proposed waterborne solutions where DICY is the curing agent. This is especially desirable in light of the environmental and safety factors noted above. Unfortunately, preparing adequate aqueous solutions in which DICY is a component has still posed significant challenges. Laborious and difficult processes have been required to get the DICY into solution. Even where this has been done, the stability of the systems has not proven reliable.

The crystallinity of the DICY molecule has much to do with its difficult behavior in epoxy resin dispersions. For example, one commercial practice requires about 10% wt of DICY to be dissolved in water at elevated temperatures. This solution is then added to an epoxy dispersion. However, the DICY/water solution must be kept hot and must be added to an epoxy dispersion before the DICY begins to crystallize out of solution. In practice, this is rarely achieved with good results. The crystals often agglomerate and settle out of solution leaving final dispersions containing large DICY crystals. Even where this agglomeration is not extensive there is almost always some DICY crystalline matter present. This can cause settling and instability of varnishes and dark spots on cured articles. Additionally, because the DICY must be added as a dilute solution, the resin/curing agent solids are compromised in the final product by decreasing the maximum resin pickup of the article.

U.S. Pat. No. 4,421,877 proposes an aqueous emulsion of epoxy resins, flame retardant phenol, monomethylol dicyanciamide or dicyandiamide curing agent, and particular nonionic alkylaryl polyether alcohol surfactants. Preparing the emulsion involves the addition of two separate solutions; an epoxy resin/phenol and surfactant solution, and a curing agent in water solution is formed. The two solutions, prepared separately, are combined. Stability of the ultimate emulsion was not demonstrated beyond two days.

The art would be benefitted by a method of producing a stable waterborne one-pack DICY curing epoxy resin system.

SUMMARY OF THE INVENTION

A process for producing stable dispersions of epoxy resins is herein presented in which an epoxy resin is mixed with water in the presence of a nonionic surfactant to form a predispersed resin. To this predispersed resin, a micronized dicyandiamide based curing agent is added to form a predispersed resinous mass. The mass is stirred for a time and at a temperature sufficient to convert the predispersed resinous mass to a stable resin dispersion.

below by structure I wherein n is 0 or a number between about 0 and 10, commonly in the range of 0 to 6, and preferably in the range between about 1 and 4.

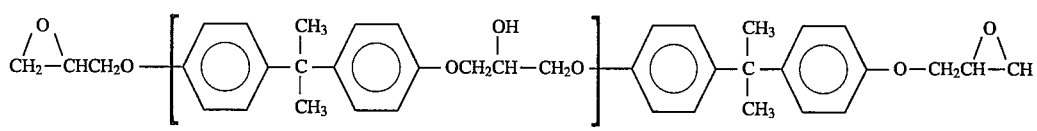

An accelerator such as 2-methylimidizole can be added to the dispersion to facilitate or hasten cure or hardening.

In another embodiment of the invention, a stable epoxy resin dispersion composition is presented. This composition is comprised of an aqueous medium, an epoxy resin as a dispersed phase in the aqueous medium, a non-ionic surfactant, and a micronized dicyandiamide based curing agent. The surfactant and dicyandiamide are each present in the dispersion of resin and aqueous medium in an amount sufficient to retain the number average particle size of said curing agent at between about 0.3 and 2.0 microns.

The process, composition, and other embodiments of the invention are useful in the manufacture of laminates, construction materials, and in other applications where protective coatings and strong structural materials are required.

DETAILED DESCRIPTION OF THE INVENTION

A process for producing a stable waterborne one-pack DICY cured epoxy resin system is now presented. DICY is added to an epoxy resin dispersion at the time of manufacture and is incorporated into the dispersed phase along with a reactive surfactant. This formulation can then be stored for relatively long periods of time. One can then simply apply the formulation in any of the well known ways for applying one-pack resins. Cure is affected by heating the article so treated. Accelerators can also be employed in this process and formulation.

To practice the process of the instant invention, one prepares a predispersed epoxy resin and water in the presence of a nonionic reactive surfactant. Micronized DICY is then added directly to this predispersed resin to form a predispersed resinous mass. The micronized DICY can be added with or without the additional presence of a reactive surfactant but it need not be premixed in its own aqueous solution prior to its addition to the predispersed epoxy resin. This mass is mixed at a temperature and for a time sufficient to form a stable dispersed epoxy resin formulation.

A "Stable Epoxy Resin Dispersion" as used throughout this specification is an epoxy resin/curing agent dispersion which, after 30 days of aging at STP, does not phase separate or exhibit crystallization of precipitation such that cure kinetics and final cured state properties are unchanged. The stable epoxy resin dispersion preferably exhibits a number average particle size of no greater than about 2.0 microns. An "Aqueous Dispersion" as used throughout this specification is a dispersion of a material (such as an epoxy resin) in water wherein water comprises the continuous phase and the material in the water comprises the dispersed phase.

Epoxy resins suitable for use in this invention include glycidyl ethers prepared by the reaction of epichlorohydrin with a compound containing at least one hydroxyl group carried out under alkaline reaction conditions. The epoxy resin products obtained when the hydroxyl group-containing compound is bisphenol-A (hereafter "BPA") are represented Other suitable epoxy resins can be prepared by the reaction of epichlorohydrin with mononuclear di- and trihydroxy phenolic compounds such as resorcinol and phloroglucinol, selected polynuclear polyhydroxy phenolic compounds such as bis(p-hydroxyphenyl)methane and 4,4'-dihydroxybiphenyl, or aliphatic polyols such as 1,4-butanediol and glycerol.

Epoxy resins suitable for the invention compositions have molecular weights generally within the range of about 200 to about 6000, preferably about 350 to about 2000. The commercially available epoxy resin EPON® Resin 1001, a reaction product of epichlorohydrin and BPA having a molecular weight of about 1100, an epoxide equivalent (ASTM D-1652) of about 525 to 550 and EPON® Resin 155, a reaction product of epichlorohydrin and phenolic novolac, having a molecular weight of about 350 and an epoxide equivalent weight of about 174 to 180 are presently the preferred epoxy resins.

The surfactants of this invention are reactive surfactants. They can be first applied to a mixture of resin and water so that an aqueous predispersed resin is created. Ultimately, the surfactant must also facilitate the further emulsification of DICY in this predispersed resin so that a predispersed resinous mass is formed.

The DICY curing agent used herein comprises between about 2.0 and 20.0% of the weight of epoxy solids in the dispersion. Preferably, between about 2.0 and 13.0 wt % is used. The DICY that is useful in this invention is micronized before it is combined with other components of the resin system. "Micronized", as used throughout this specification means that the material is treated so as to render the number average particle size thereof between about 1 and 50 microns. Preferably, the micronized DICY has a number average particle size of less than 5 microns. This micronized DICY can be commercially obtained from Air Products and Chemicals, Inc and is sold as AMICURE® CG-1400.

The most preferred embodiments of the stable aqueous dispersions of this invention are one-pack systems. Such systems are made by mixing water, an epoxy resin, a reactive surfactant, and micronized DICY component to form a dispersed resinous mass that has changed from a resin continuous phase to a water continuous phase by phase inversion. This mass is then stirred at a temperature and for a time sufficient to decrease dispersion particle size and to stabilize the mass. Alternately, an epoxy resin can be reaction modified in water, and then mixed with surfactant and DICY and phase inverted to a stable dispersion. The resin mass before and during inversion contains between about 2 and 30 parts by weight water and between about 2 and 30 parts of an aqueous surfactant solution. Preferably, the aqueous surfactant solution comprises between about 4 and 12 wt % (based on total weight of surfactant solution) surfactant as described above. The resin, water, and surfactant solution are generally agitated for between about 2 and 24 hours at a temperature of between about 30° and 100° C. The time and temperature required are those which will result in phase inversion and reduction of particle size of the components which is readily adjustable as will be understood by the skilled artisan. Optionally, the resin can be comprised of a modified resin such as a resin further reacted with BPA in the presence of a catalyst. The water is preferably deionized water but most tap water is suitable. Between about 5 and 55% by weight water can be added to the predispersed resin so formed to adjust the solution to a concentration which will ultimately result in the desired solids content. The predispersed resin is maintained under agitation at a temperature between about 30° and 100° C. prior to and during the addition of the DICY component. Micronized solid DICY is added directly to this predispersed resin and maintained at a temperature between about 30° and about 100° C. for between about 5 and 60 minutes. After about 15 minutes of the agitation/heating, the product will appear as a fluffy white liquid. This is the predispersed resinous mass. It will readily disperse in water. The dispersed mass is held at temperature for about 1 to 24 hours to further decrease particle size. Additional water can also be added after achieving the desired particle size to bring the material to the desired solids content. It is preferred that between about 20 and 40% by weight water be added to bring the solution to a 30 to 80% w solids content.

One-pack systems prepared according to the process of this invention can be stored at room temperature for considerable periods of time. After storage, the user of such a system merely applies the mixture to the surface or article that is to be coated or otherwise treated with epoxy resin and exposed to heat of between about 150° and 250° C. for about 5 to 120 minutes or until cure is noticeable. The addition of an accelerator can alter the curing conditions. Time and/or temperature of cure can thus be reduced as will readily be appreciated by those skilled in the art.

Suitable accelerators include tertiary amines, imidizoles, ureas, phenols, phosphines, octoates and boron triflouride and derivatives thereof. Imidizoles are preferred because of their ease of incorporation into a waterborne preparation. Accelerators are added at room temperature to effect final cure of the composition of this invention. The amount of accelerator may vary within wide limits from about 0.01 to about 2.0 parts per hundred by weight of polyepoxide (phr), and preferably from about 0.05 to about 1.0 phr, and more preferably 0.2 to 0.5 phr.

The composition of this invention may optionally be incorporated with other conventional additives, such as fillers, reactive diluents, solvents for resins, rust preventatives, dyestuffs and pigments, antioxidants, and the like.

Under certain conditions, it may be desirable to utilize a two-package system wherein the DICY is dispersed with the resin in water at higher than normal concentrations and then this concentrate (as one package) is used with additional waterborne resin (as the second package) as a blending stock to formulate the appropriate concentrations of each. The accelerator is mixed into the blended resin. The packages can be mixed for a time and at a temperature required for the desired degree of cure as will be readily understood by one skilled in the art. Of course, if additives or modifiers are to be added to the system this will be done prior to the completion of cure.

The compositions prepared by practicing the process of this invention may be utilized in many applications such as for coatings and impregnating compositions in the preparation of adhesives for metals, wood, cement and the like, and in the preparation of reinforced composite products, such as laminated products, filament windings, sheet molding compounds (SMC), and electrical laminates. A very suitable application is in the preparation of reinforced products and laminates wherein the compositions are applied to fibrous products such as glass fibers or sheets and material formed into the desired object and cured.

The following nonlimiting examples will further illustrate the invention. Unless otherwise indicated, parts and percentages are by weight. Viscosity was measured by use of a Brookfield viscometer using a No 5 spindle at speed 20. Dispersion particle size was determined by disc centrifuge photosedimentometry using a Brookhaven DCP instrument. Epoxide equivalent weight was measured using colormetric titration with perchloric acid. Onset of cure was determined by differential scanning calorimetry.

EXAMPLE 1 (Epoxy Resin Formation)

To a kettle reactor were charged 362.7 grams of diglycidyl ether of BPA having an epoxide equivalent weight of 188, EPON® Resin 828 manufactured by Shell Chemical Company, and 127.7 grams of BPA, BPA-157 manufactured by Shell Chemical Company. This mixture was heated and stirred at about 177° F. until the BPA dissolved in the liquid epoxy resin. 18 grams of deionized water and 1.3 grams of triphenyl phosphine catalyst were then added to this mixture. The mixture was allowed to react at 177° F. for two hours. The epoxide equivalent weight of the reaction product was 620.

EXAMPLE 2 (One-Pack Formation)

To the reaction product of example 1 in water was added 107.2 grams of a reactive surfactant, prepared by reacting 2 moles of polyoxyethylene glycol and 1 mole of a glycidyl polyether of BPA having an epoxy equivalent weight of 468. The surfactant was added to the reaction mass as a 32.5% w solution in water slowly so as to maintain the temperature of the reaction mass at 177° F. An additional 33.2 grams of deionized water was then added to this mixture. A predispersed epoxy resin was thus formed.

20.3 grams of micronized DICY having an average particle size of 8 microns was added to the predispersed epoxy resin. After a 30 minute hold at 177° F., the mass was a fluffy white liquid predispersed resinous mass.

A 2 gram sample of the predispersed resinous mass easily dispersed in a vial of water. The water phase was the continuous phase. The average particle size of the dispersed phase (organic) was determined to be about 1–2 microns by visual inspection.

The predispersed resinous mass was agitated and held at 177° F. for an additional three hours. 241 grams of additional deionized water was added to the mass to yield a 60% wt solids solution, based on total resinous solids in water. This predispersed resinous mass was then cooled.

The resultant dispersion had a number average particle size of 1.19 as determined by disc centrifuge photosedimentometry. The final weight per epoxide on a solids basis was 685. The viscosity of the dispersion was 8000 cP. The resultant dispersion displayed an onset of cure at 175° C., determined by differential scanning calorimetry.

The resultant dispersion was then aged at room temperature for three months. The number average particle size was then determined to be 0.95, the weight per peroxide was 680 and the viscosity was 7900 cP. Onset of cure was again determined to be 175° C. by differential scanning calorimetry.

This example illustrates the formation of a stable waterborne one-pack dispersion of a solid epoxy resin and DICY.

EXAMPLE 3 (One-pack Formation)

A reactive surfactant prepared by reacting 2 mols of polyoxyethylene glycol and 1 mol of a glycidyl polyether of BPA having an epoxy equivalent weight of 468 was charged to a four neck glass reaction flask. 105 grams of this surfactant in water (32.5% w solids in water) was added. An additional 110 grams of DI water was added and the solution was then agitated and heated to 140° F.

565.8 grams warmed, 100° F., diglycidyl ether of BPA having an epoxide equivalent weight of 188 (commercially available from Shell Chemical Company under the tradename EPON® Resin 828) were added to the reactor over the course of 90 minutes to form a predispersed resin. 34 grams of DICY micronized to an average particle size of 8 microns was then added to the reaction mass. A fluffy white liquid predispersed resinous mass was formed after a 30 minute hold with agitation but no additional heat. A 2 gram sample of the predispersed resinous mass easily dispersed in a vial of water.

Vacuum was applied to the predispersed resinous mass as it was agitated at 95° F. for 60 minutes. 219 grams of deionized water was then added to bring the mixture to a 60% wt solids dispersion. This resulted in the formation of a stable epoxy resin dispersion with a number average particle size of 0.56, a weight per epoxide on a solids basis of 200, a viscosity of 1800 cP, with an onset of cure occurring at 172° C., measured by differential scanning calorimetry.

The stable epoxy resin dispersion was aged at room temperature for 3 months. After aging, the dispersion was found to have a number average particle size of 0.60, weight per epoxide of 200, viscosity 1850 cP, and onset of cure occurring at 170° C., by differential scanning calorimetry.

This example illustrates that a stable one-pack dispersion of a liquid epoxy and DICY in an aqueous medium is formed from the process of this invention.

EXAMPLE 4 (One-Pack Formation)

A reactive surfactant prepared by reacting 2 mols of polyoxyethylene glycol and 1 mol of a glycidyl polyether of BPA having an epoxy equivalent weight of 468 was charged to a four neck glass reaction flask. 105 grams of this surfactant in water (32.5% w solids in water) was added.

An additional 110 grams of DI water was added and the solution was then agitated and heated to 140° F.

351 grams of warmed, 100° F., tetra glycidyl ether of phenolic novolac having an epoxide equivalent weight of 205 (commercially available from Shell Chemical Company under the tradename EPON® Resin 155) and 40 grams of DICY micronized to an average particle size of 8 microns were mixed together to form a solid dispersed in liquid resin mass. This mass was added to the reactor containing surfactant over the course of 90 minutes. A fluffy white aqueous liquid predispersed resinous mass was formed. A 2 gram sample of the predispersed resinous mass easily dispersed in a vial of water.

The predispersed resinous mass was sheared for an additional 30 minutes. 1.32 grams of deionized water was then added to bring the mixture to a 70% wt solids dispersion. This resulted in the formation of a stable epoxy resin dispersion with a number avenge particle size of 0.62, a weight per epoxide on a solids basis of 230, a viscosity of 57,360 cP, with an onset of cure occurring at 175° C., measured using differential scanning calorimetry.

The stable epoxy resin dispersion was aged at room temperature for 3 months. After aging the dispersion was found to have a number avenge particle size of 0.60, weight per epoxide of 235, viscosity 59,520 cP, and onset of cure occurring at 174° C., measured by differential scanning calorimetry.

This examples illustrates the formation of a stable multifunctional epoxy system by the process of this invention. It also illustrates that the DICY can be added simultaneously with the liquid epoxy resin.

EXAMPLE 5 (Accelerator Addition)

A 10% wt solution of 2-methyl imidazole solution was prepared. 1.5 grams was added to the stable epoxy resin dispersion of example 3. 1.0 gram was added to the stable epoxy resin dispersion of example 4. Films were cast from both accelerated formulations with a 2 mil metering bar. The films were cured at 350° F. for 20 minutes.

Both films showed a high degree of cure as evidence by greater than 100 methyl ethyl ketone double rubs with weighted cheese cloth. Full cure was also evidenced by no exotherm present in a temperature sweep from 50 to 300 degrees C. at 20 degrees C. per minute using differential scanning calorimetry.

EXAMPLE 6 (Comparative)

An epoxy resin solution of example 1 (without of addition of DICY) was prepared having a 60% wt solid epoxy in water content, a weight per peroxide of 650, a viscosity of 9,500 cP, and a number average particle size of 1.2 (commercially available from Shell Chemical Company under the trade name EPI-REZ® Resin 3522-W-60). Each of these properties was determined as set forth above.

20.3 grams of DICY was dissolved in 182.7 grams of hot water. This DICY solution was then added to the 60% wt epoxy resin solution. (EPI-REZ® Resin 3522-W-60) with agitation, as is practiced commercially. Onset of cure was found to be 175° C.

The resultant dispersion was aged at room temperature for 3 months. After 8 days the dispersion separated into a heavy bottom layer and light top layer. Onset of cure was now found to occur above 200° C.

This example shows that the stability of a solution of epoxy and DICY in water is not stable by mere mixing and that the method of emulsifying DICY of this invention are not employed. Also, in the current practice of adding the DICY as a water solution, the resin solids of said system is compromised (because of the large amount of water necessary to dissolve the DICY).

Films were east using the freshly prepared dispersion of this example catalyzed with 1.0 gram of a 10% w 2-methyl imidazole solution using a 2 mil metering bar. The films were cured at 350 degrees F. for 20 minutes. The films showed many imperfections as evidenced by small particles over the surface. The particles were suggestive of fine DICY precipitation. Comparable films prepared in Example 5 were flawless.

What is claimed is:

1. A method for using a stable epoxy resin dispersion composition comprising:

a) an aqueous medium, b) an epoxy resin as a dispersed phase in said aqueous medium, c) a surfactant prepared by reacting 2 moles of polyoxyethylene glycol with 1 mole of a glycidyl ether of BPA having an epoxy equivalent of about 468, d) a micronized dicyandiamide curing agent, wherein said surfactant and said dicyandiamide are each present in said dispersion of resin and aqueous medium in an amount sufficient to retain the number average particle size of said stable epoxy resin dispersion at no greater than about 2.0 microns and said dispersion is a one-pack system prepared substantially without the presence of organic solvents;

said method comprising applying said dispersion to a substrate.

2. A method of using the composition of claim 1 comprising:

a) applying said composition to a surface, and b) subjecting said surface to conditions sufficient to allow said composition to cure.

3. The method of claim 2 further comprising the step of mixing said dispersion with an accelerator.

4. The method of claim 3 wherein said accelerator is selected from the group consisting of imidazoles, tertiary amines, ureas, and phenols.

\* \* \* \* \*